United States Patent
Rowley, Jr. et al.

(10) Patent No.: US 7,736,409 B2
(45) Date of Patent: Jun. 15, 2010

(54) CYCLONE PROCESSING SYSTEM WITH VORTEX INITIATOR

(75) Inventors: Frank F. Rowley, Jr., Valley Center, KS (US); Marilyn M. Rowley, legal representative, Valley Center, KS (US); Randolph B. Robinson, Wichita, KS (US)

(73) Assignee: Furrow Technologies, Inc.

( * ) Notice: Subject to any disclaimer, the term of this patent is extended or adjusted under 35 U.S.C. 154(b) by 433 days.

(21) Appl. No.: 11/796,552

(22) Filed: Apr. 27, 2007

(65) Prior Publication Data

US 2008/0264013 A1    Oct. 30, 2008

(51) Int. Cl.
*B01D 45/12* (2006.01)

(52) U.S. Cl. .............. 55/459.1; 55/396; 55/455; 55/459.5; 55/418; 55/419; 209/143; 209/715; 209/717; 209/719

(58) Field of Classification Search ........... 55/459.1, 55/396, 455, 459.5, 418, 419; 209/143, 715, 209/717, 719
See application file for complete search history.

(56) References Cited

U.S. PATENT DOCUMENTS

| | | | |
|---|---|---|---|
| 1,830,174 A | | 11/1931 | Peebles |
| 2,735,547 A | * | 2/1956 | Vissac .................. 209/550 |
| 3,279,560 A | * | 10/1966 | Hubrich .................. 181/247 |
| 3,289,608 A | * | 12/1966 | Laval, Jr. ................ 166/105.1 |
| 3,426,513 A | * | 2/1969 | Bauer ...................... 55/459.1 |
| 3,507,397 A | * | 4/1970 | Robinson ................ 210/512.1 |
| 3,794,251 A | | 2/1974 | Williams |
| 3,800,429 A | | 4/1974 | Lindl |
| 3,896,984 A | | 7/1975 | Edwards |
| 3,925,044 A | * | 12/1975 | Tu et al. .................... 55/337 |
| 3,937,405 A | | 2/1976 | Stephanoff |
| 3,969,096 A | * | 7/1976 | Richard .................... 55/455 |
| 4,151,044 A | * | 4/1979 | Choi ......................... 201/12 |
| 4,187,615 A | | 2/1980 | Iwata |
| 4,198,290 A | * | 4/1980 | Summers ................ 209/710 |
| 4,236,321 A | | 12/1980 | Palmonari et al. |
| 4,304,360 A | | 12/1981 | Luhr et al. |
| 4,390,131 A | | 6/1983 | Pickrel |
| 4,478,862 A | | 10/1984 | Greethead |
| 4,505,051 A | | 3/1985 | Herchenbach et al. |
| 4,532,155 A | | 7/1985 | Golant et al. |
| 4,736,527 A | | 4/1988 | Iwamoto et al. |
| 4,756,093 A | | 7/1988 | Heinemann et al. |

(Continued)

*Primary Examiner*—Jason M Greene
*Assistant Examiner*—Dung Bui
(74) *Attorney, Agent, or Firm*—Polsinelli Shughart PC; Marcia J. Rodgers; Dennis A. Crawford

(57) ABSTRACT

A cyclone-type processor has a vortex initiator positioned thereabove and an exhaust sleeve extending through the initiator and into the processor. A blower connects to the initiator chamber by a duct having a divider wall that separates the duct into an air-only channel and an entrained material channel. A feed inlet feeds material to be processed into the air flow of the entrained channel. The vortex initiator includes an outer annular chamber and an inner annular chamber open to the cyclone processor and is engaged by the duct to convey air into the outer chamber and air entrained material into the inner chamber. The inner and outer chambers and slots therebetween cooperate to cause the air flow to form a vortex and to urge entrained material away from the inner wall. The system may include additional cyclone stages for further material treatment.

13 Claims, 4 Drawing Sheets

U.S. PATENT DOCUMENTS

| | | | |
|---|---|---|---|
| 4,969,934 A * | 11/1990 | Kusik et al. | 95/270 |
| 4,978,076 A | 12/1990 | Andrews et al. | |
| 5,012,619 A | 5/1991 | Knepprath et al. | |
| 5,068,979 A | 12/1991 | Wireman et al. | |
| 5,074,476 A | 12/1991 | Mund | |
| 5,096,744 A | 3/1992 | Takei et al. | |
| 5,102,055 A | 4/1992 | Buschmann et al. | |
| 5,143,303 A | 9/1992 | Niemi | |
| 5,236,132 A | 8/1993 | Rowley, Jr. | |
| 5,346,141 A | 9/1994 | Kim et al. | |
| 5,413,285 A | 5/1995 | Matthews et al. | |
| 5,496,394 A * | 3/1996 | Nied | 95/271 |
| 5,598,979 A | 2/1997 | Rowley, Jr. | |
| 6,517,051 B1 | 2/2003 | Rowley, Jr. | |
| 6,715,705 B2 | 4/2004 | Rowley, Jr. | |
| 6,827,820 B1 * | 12/2004 | Meinander | 162/189 |
| 6,887,290 B2 * | 5/2005 | Strauser et al. | 55/283 |
| 6,896,720 B1 * | 5/2005 | Arnold et al. | 95/271 |
| 6,971,594 B1 | 12/2005 | Polifka | |
| 7,357,824 B2 * | 4/2008 | Hakola | 55/435 |
| 2003/0164328 A1 * | 9/2003 | Arnaud | 210/512.1 |
| 2007/0214756 A1 * | 9/2007 | Lee | 55/419 |

* cited by examiner

CYCLONE PROCESSING SYSTEM WITH VORTEX INITIATOR

BACKGROUND

The present disclosure is broadly concerned with cyclone processing systems for comminuting, dehydrating and/or separating materials. More particularly, it is concerned with a cyclone processing system having a friction reducing vortex initiator.

Devices for comminuting, dehydrating and separating materials are well known. Examples include U.S. Pat. No. 5,236,132 issued Aug. 17, 1993, U.S. Pat. No. 5,598,979 issued on Feb. 4, 1997, U.S. Pat. No. 6,517,015 issued on Feb. 11, 2003 and U.S. Pat. No. 6,715,705 issued on Apr. 6, 2004, all issued to Frank Rowley, Jr., all of which are incorporated herein by reference. Such prior art devices include a cyclone chamber mounted atop a conical body, an adjustable coaxial sleeve for introducing into the cone the material to be processed from the lower end thereof and venting exhaust from the upper end thereof, a damper for reducing air flow upward and outward through the sleeve, and an air supply unit such as a fan. A material introduction unit or feeder device is interposed between the blower and the chamber, and material may also be introduced into the chamber through the coaxial sleeve. Processed material exits the lower end of the cone and may be deposited on a conveyor, a pneumatic conveyance system, or collected in an open bin. Such cyclonic devices are suitable for comminuting, dehydrating and separating virtually any known material, including materials such as minerals, plants, food products, recyclable materials and soil.

Cyclone processing systems may be employed for pulverizing and separating ores such as gold, silver, copper, kaolin and which are recovered from rock formations presenting a different density or structure than the ore. They may also be employed to pulverize and dehydrate materials such a gypsum, fly ash, foundry shag, coal, coke, phosphates and residual products of refining and distillation processes, including animal shells and crustaceans as well as bones, diatomaceous earth and soil structures. They may be employed to pulverize, dehydrate and preserve food products such as grain, and grain components such as gluten, and for fractionalization of the starch protein matrix, as well as for enhancement of lipid or fiber content for further processing or defatting. They may be employed for fragmentation and dehydration of fibrous foods such as carrots, apples, beans and spinach and for pulverization and dehydration of lignocellulosic biomass materials such as trees, seaweed, straw, peat moss, waste paper and animal wastes. Such cyclonic processing units may also be employed in recycling for pulverizing glass, metals, plastic and organic materials so that such components may be mechanically sorted and separated. The units may also be used to pulverize and dehydrate soil and to separate it from rock, ash, boron, hydrocarbons and other contaminants, either alone or in conjunction with washing, thermal, biological, or other treatment processes.

The comminuting or separating rate and the coarseness of the comminuted or separated material may be controlled by raising and lowering a sleeve positioned within and extending upwardly from the cyclone as described more fully in the patents previously incorporated by reference. Such raising and lowering of the sleeve is cumbersome, especially in larger units, where the apparatus is heavy and not easily shifted, and two-stage units, where one cyclone may be positioned laterally below another unit. Moreover, such cyclone systems are subject to adherence or sticking of entrained material to the inner wall surfaces of the cyclone inlet, so that it does not remain in the vortex and pass easily downward into the cone for processing in response to manipulation of the sleeve. This peripheral adherence negatively affects the throughput, ability to control particle size of the adhered material and overall efficiency of the processor.

SUMMARY

The present disclosure provides a greatly improved cyclone processing system having a vortex initiator that reduces friction between entrained material and the cyclone inlet while regulating the rate of the process by telescopic raising and lowering of the sleeve within the cyclone chamber.

The system includes a conically shaped cyclone-type processor having a cylindrical vortex initiator positioned above the inverted cone and an exhaust sleeve extending through the initiator and into the processor entry. A blower is tangentially connected to the initiator chamber by a duct having a divider wall that separates the duct into a pair of channels, one carrying only air, and the other carrying air-entrained material. The entrained duct channel includes a feed inlet for entraining material to be processed into the flow of air in the channel. The vortex initiator includes partially cylindrical outer and inner walls, the inner wall positioned coaxially within the outer wall to form an outer substantially annular chamber. The inner wall includes a series of apertures. Together with the sleeve, the inner wall forms an inner annular chamber open to the cyclone processor below. Annular upper and lower walls enclose the outer annular chamber, and the upper wall also extends axially inwardly to close the top of the inner annular chamber and sealingly engage the sleeve. The duct tangentially engages the initiator chamber with the divider wall engaging the inner wall to communicate high velocity or pressurized air into the outer chamber and to communicate air carrying entrained material into the inner chamber. The inner and outer annular chambers and slots therebetween cooperate to cause the air flow to form a vortex, and the airflow through the slots urges entrained material away from the inner wall. An actuator may be used to raise and lower the position of the telescoping sleeve within the cone to control the introduction of the entrained material into the cone. The system may include additional cyclone units fed by a single blower in an air flow loop which cycles material between the cones.

Various objects and advantages of this vortex initiator will become apparent from the following description taken in conjunction with the accompanying drawings wherein are set forth, by way of illustration and example, certain embodiments.

The drawings [including FIGS. 1-5 constitute a part of this specification, include exemplary embodiments of the friction reducing vortex initiator system, and illustrate various objects and features thereof.

DETAILED DESCRIPTION

As required, detailed embodiments of the vortex initiator are disclosed herein; however, it is to be understood that the disclosed embodiments are merely exemplary of the device, which may be embodied in various forms. Therefore, specific structural and functional details disclosed herein are not to be interpreted as limiting, but merely as a basis for the claims and as a representative basis for teaching one skilled in the art to variously employ the apparatus in virtually any appropriately detailed structure.

Figure 1:
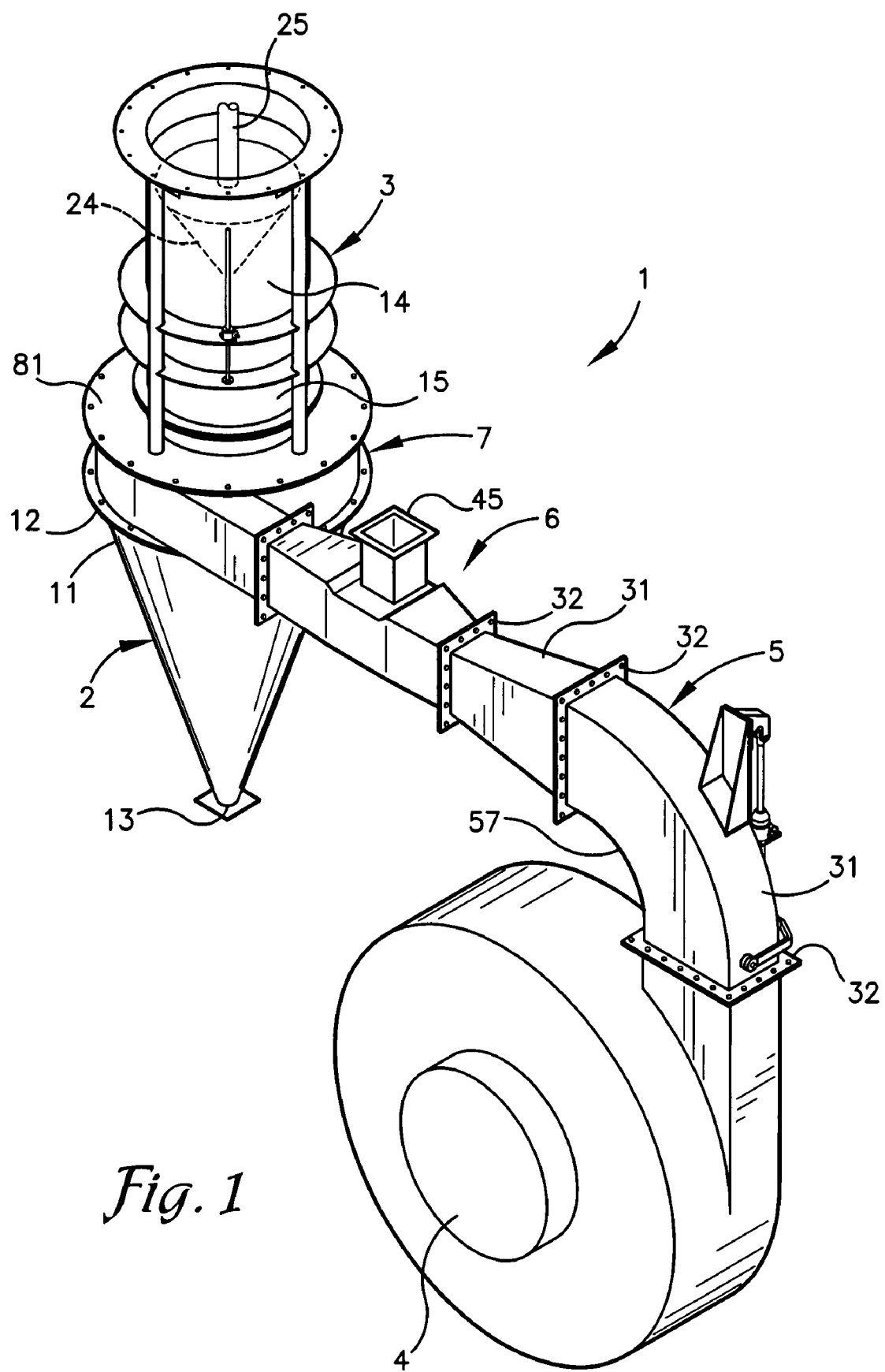
FIG. 1 is a perspective view of a cyclone processor with friction reducing vortex initiator.

Referring now to the drawing figures, the reference numeral 1 refers to a cyclone processing system 1, which is depicted in FIG. 1 to include a cyclone processor 2 for comminuting, dehydrating and/or separating a selected material from a gas flow, an exhaust sleeve assembly 3, an air supply unit 4, a duct assembly 5 communicating with the air supply unit 4, a material introduction inlet 6, and a vortex initiator assembly 7.

Figure 2:
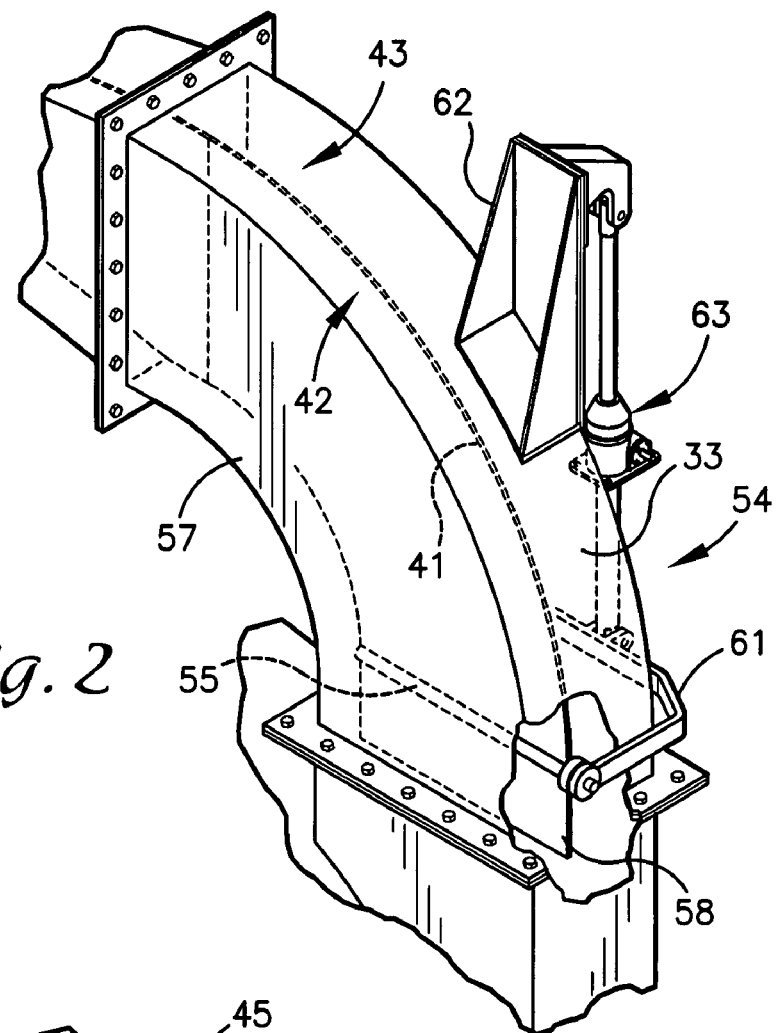
FIG. 2 is an enlarged fragmentary perspective view of the adjustment vane and vane actuator of FIG. 1 with parts broken away, and the divider wall and parts of the vane and actuator structure shown in phantom.
Figure 4:
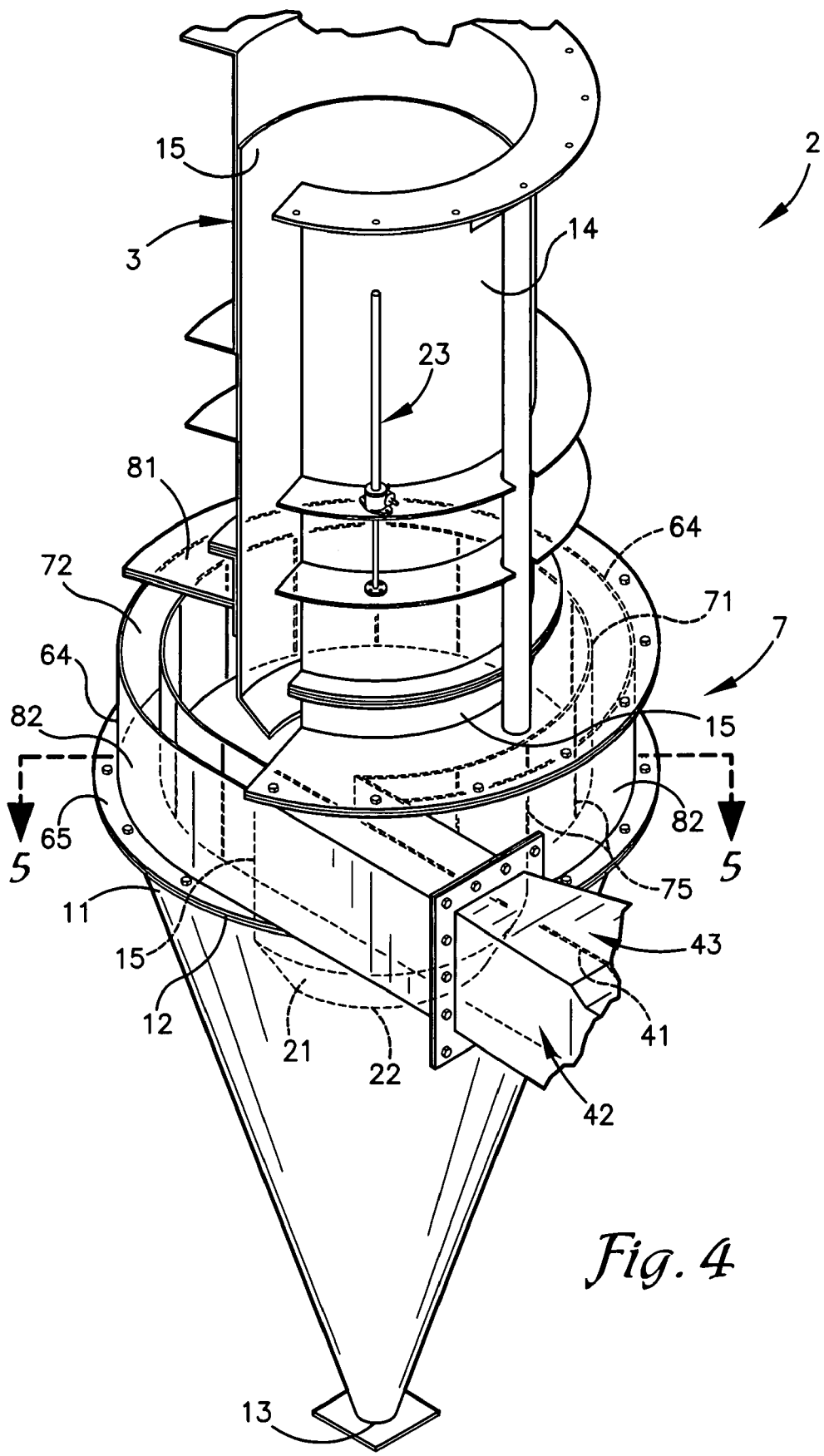
FIG. 4 is a fragmentary perspective view of a cyclone processor with friction reducing vortex initiator, with parts broken away for clarity and with certain parts, including the extended position of the sleeve, shown in phantom.

The processor 2, shown in FIGS. 1 and 2, has a generally conical configuration and includes a larger diameter open upper entry end 11 with a radially expanded outstanding flange 12 (FIG. 4). The lower tip of the processor 2 is slightly truncated or frustoconical to provide a lower outlet end 13 positioned opposite and having a smaller diameter than the entry end 11 for gravitational discharge of material following processing.

An exhaust sleeve assembly 3 is axially aligned for extension through the upper entry end 11 and downward into the processor 2 (FIG. 4). The sleeve assembly 3 includes a hollow, tubular outer sleeve 14 that is stationary or fixed in place and is sized for close slidable, telescoping reception of a movable inner sleeve 15 (FIGS. 1, 4). The lower end of the inner sleeve 15 includes a conical lip portion 21 that is axially angled downwardly to form a lower end or opening 22 having a somewhat smaller diameter than that of the inner sleeve 15. An actuator 23 enables upward and downward telescopic adjustment of the inner sleeve 15 relative to both the outer sleeve 14 and the conical cyclone processor 2 as shown in phantom in FIG. 4.

A generally conical damper 24 (FIG. 1) is positioned axially within the sleeve 3 for selectively restricting the flow of air from the processor 2 upwardly through the sleeve assembly 3 and into the atmosphere or to further processing stages downstream of the system 1. The damper 24 is threadably mounted on a rod 25 for actuation by means of a jack, cylinder or electric motor (not shown) that enables adjustment of the damper 24 upwardly or downwardly, that is vertically, within the sleeve 3. While the damper 24 depicted in the drawing figures has an inverted cone shape, other possible embodiments may include dampers with generally cylindrical, disc shaped, curved or any other suitable geometric configurations.

Figure 3:
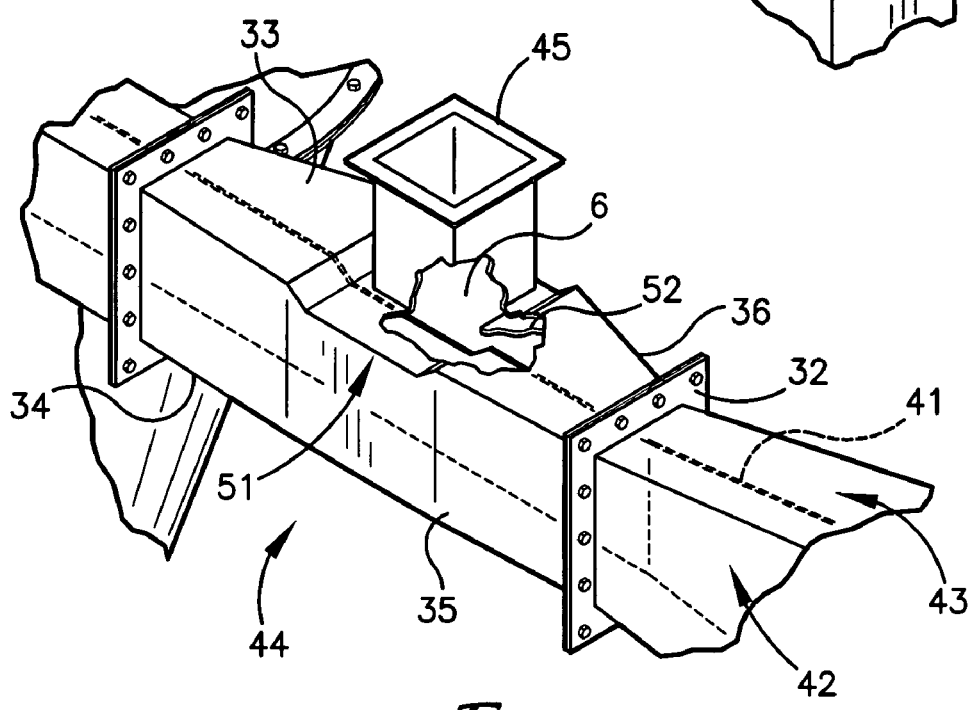
FIG. 3 is an enlarged perspective view of the feed segment of FIG. 1 with parts broken away to show the venturi plate and with the divider wall shown in phantom.

The air supply unit 4 includes a blower or fan capable of generating a flow of air at high volume and velocity. It is foreseen that a compressor may also be employed. The air supply unit 4 and the vortex initiator 7 are interconnected by means of an elongated hollow conduit or duct assembly 5 that is constructed of a series of sections or segments 31 that are coupled together by means of fasteners connecting adjacent outstanding flanges 32 at each segment end (FIG. 3). The duct segments 31 may be generally straight, or they may be curved to form an elbow (FIGS. 1, 2) to permit angular connections. While the duct assembly 5 and its segments 31 are depicted as having a generally rectangular shape when viewed in cross-section, it is foreseen that some or all of the segments 31 may be generally cylindrical, oval or of any other suitable configuration. In the generally rectangular embodiment depicted in FIGS. 1-4, each duct segment 31 includes a top wall 33, bottom wall 34 and first and second side walls 35 and 36 (FIG. 3).

As shown in FIGS. 2-5, the duct assembly 5 also includes a longitudinal separator or divider wall 41 that separates the duct into an air-only duct portion or channel 42 and an entrained duct portion or channel 43. The entrained duct channel 43 is depicted as slightly larger in size than the air-only duct channel 42 (FIG. 5) to accommodate entrained material. Those skilled in the art will appreciate that the relative sizes of the channels 42 and 43 are selected to optimize airflow therethrough and that in some cases the channels may also be substantially equal in size. As best shown in FIG. 3, at least one segment 31 of the duct assembly 5 is configured to form a feed segment 44, and the material introduction port or feed inlet 6 is provided in communication with the entrained duct portion 43 of the feed segment 44. The feed inlet 6 is equipped with a hopper connection 45 to permit connection of a hopper (not shown), which further may be equipped with a gate valve (also not shown) at the lower end thereof to control the rate of gravity feed of material into the inlet 6.

As shown in FIG. 3, the feed segment 44 includes a venturi mechanism 51 as more fully described and shown in U.S. Pat. No. 6,715,705 issued to Frank Rowley, Jr. and incorporated herein by reference, although any other suitable venturi may be employed. The illustrated venturi 51 includes a baffle 52 which serves to reduce the air pressure in the feed segment 44, creating a slight vacuum enabling material to be positively introduced or drawn into the entrained duct portion 43, and preventing backflow out of the feed inlet 6 during material introduction. An air lock (not shown) also may be employed in conjunction with the hopper connection 45 to further guard against backflow.

An adjustment vane 53 is pivotally mounted within the duct 5 in angular relation to the divider wall 41 (FIG. 2). A vane actuator 54 engages the vane 53 for pivotal movement to selectively proportion the airflow between the air-only duct portion 42 and the entrained duct portion 43. Various materials, because of their density, particulate size, moisture content, or the material characteristics are more optimally entrained in varying flow rates. The vane actuator 54 includes a pivot pin, trunnions or the like 55 pivotally coupling the vane 53 with the divider wall 41. The ends of the pivot pin 55 are captured by the arms of a bail 61. A support bracket 62 is fixedly connected to the top wall 33 of the illustrated elbow duct section 57, and a linear actuator 63 is engaged between the bracket 62 and the bail 61. The linear actuator 63 may include a fluid cylinder, jack screw(s) or the like to permit extension and retraction of the actuator 63. This action operates to pivot the bail 61 upwardly and downwardly, thereby pivoting the vane 53 to change its angle with respect to the divider wall 41 and selectively adjust the proportion of high velocity air entering the air only portion 42 and entrained portions 43 of the duct 5.

Figure 5:
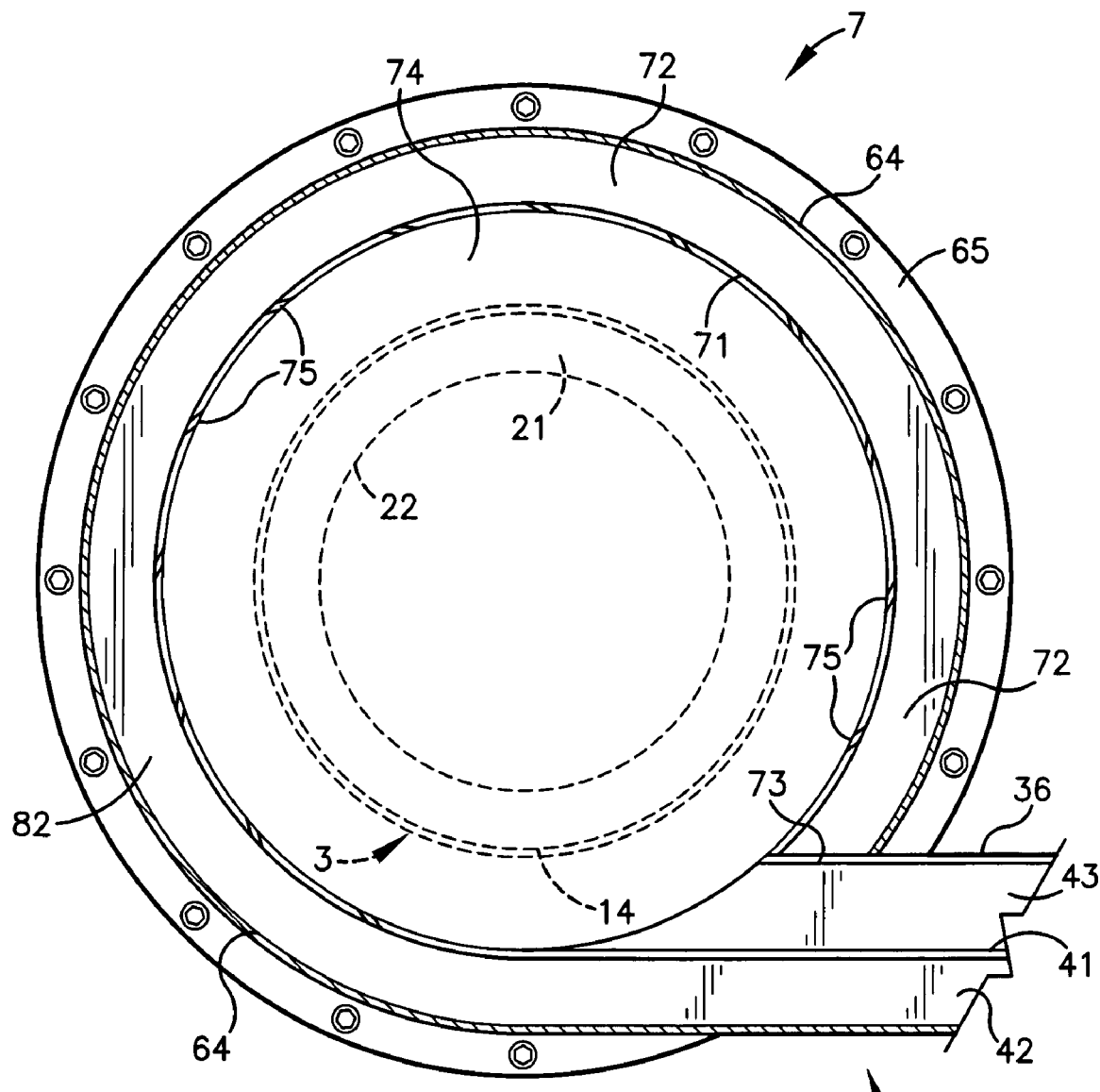
FIG. 5 is a greatly enlarged horizontal sectional view taken along line 5-5 of FIG. 4, showing details of the vortex initiator with the telescoping exhaust sleeve shown in phantom.

The vortex initiator assembly 7 is shown in FIGS. 1, 4 and 5 to be generally cylindrically shaped and sized for positioning in axial alignment on the open upper entry end 11 of the cyclone processor 2. The initiator 7 includes a partially cylindrical outer wall 64 having a radially outstanding flange 65 at the lower end thereof that is sized for mating engagement with the radial flange 12 of the entry end 11 of the processor 2. A partially cylindrical inner wall 71 is positioned in spaced coaxial relation to the outer wall 64 so that it engages the divider wall 41 of the duct 5 in a tangential manner. The coaxial outer and inner walls 64 and 71 cooperatively define a substantially annular or penannular outer chamber 72 therebetween. The duct 5 engages the vortex initiator 7 in a tangential manner so that a proximal portion of the second sidewall 36 serves as a stop wall 73 for the outer chamber 72 (FIG. 5).

The inner wall 71 and the exhaust sleeve assembly 3 cooperatively define an annular inner chamber 74. The inner wall 71 includes a plurality of circumferentially spaced, axially oriented or vertical slots 75 formed therethrough to permit passage of air from the outer chamber 72 into the inner chamber 74. The slots 75 subtend an angle (FIG. 5) with respect to the inner wall 71, so that air entering the inner chamber 74 through the slots 75 is directed in a clockwise, substantially tangential manner around the inner chamber 74 to further initiate and enhance the vortex formed in the inner chamber 74.

Generally annular and axially spaced upper and lower walls 81 (FIG. 4) and 82 (FIG. 5) are end engaged with the outer and inner walls 64 and 71. The annular lower wall 82 is sized for closing the outer annular chamber 72. The annular upper wall 81 extends radially inwardly from atop the cylindrical outer wall 64 to sealingly engage the exhaust sleeve 3 and thereby close the upper sides of both the inner and outer annular chambers 74 and 72. Thus, the outer chamber 72 is enclosed by the cylindrical outer wall 64, the inner wall 71, and the upper and lower walls 81 and 82, while the inner chamber 74 is enclosed by the upper wall 81, the inner wall 71 and the sleeve 3, but remains open to the cyclone processor 2 below.

As shown in FIGS. 4 and 5, the duct 5 engages the vortex initiator 7 tangentially, with the first duct sidewall 35 tangentially engaging the cylindrical outer wall 64, the second duct sidewall 36 intersecting the cylindrical outer wall 64 and intercepting the cylindrical inner wall 71 to form the stopwall 73, and the divider wall 41 tangentially engaging the inner wall 71. This structure enables the air-only portion 42 of the duct 5 to communicate pressurized air into the outer annular chamber 72 and the entrained portion 43 to communicate high velocity air carrying entrained material into the inner annular chamber 74.

In use, the blower unit 4 is actuated to simultaneously generate a flow of high velocity or pressurized air into both the air-only and the entrained channels 42 and 43 of the duct 5. A user introduces a quantity or stream of material to be processed into the entrained portion 43 of the feeder duct segment 44 via a hopper or other suitable device that is coupled with the hopper connection 45. The material is entrained by the flow of air and carried forwardly through the remaining sections 31 of the duct 5 and toward the vortex initiator 7.

When it reaches the vortex initiator 7, the flow of high velocity air in the air-only duct portion 42 travels in a rotary manner in a clockwise direction (as illustrated) into the outer chamber 72 until it meets the stopwall 73, which causes an increase in air pressure in the outer chamber 72. At the same time, the flow of high velocity air carrying entrained material in the entrained duct channel 43 travels in a rotary manner in a clockwise direction (as illustrated) into the inner chamber 74, where it forms a vortex within the cyclone processor 2. The higher air pressure in the outer chamber 72 urges airflow through the slots 75 in a substantially tangential manner and into the inner chamber 74, further enhancing formation of the vortex within the processor 2 and urging the entrained material in the inner chamber 74 away from the partially cylindrical inner wall 71, thereby reducing friction of the entrained material against the inner cylinder wall. In some cases this reduces frictional wear of the inner wall 71, while in other cases adherence of the entrained material on the inner surface of the inner wall 71 is reduced. It is also foreseen that, while the flow of air is illustrated as clockwise when viewed from above, the vortex initiator 7 alternatively may be configured to create a counter-clockwise vortex.

The user may further adjust the pressure differential between the air-only and entrained duct channels 42 and 43 by activating the linear actuator 63 to raise or lower the bail 61, which in turn pivots the vane about the pivot pin 55 so that it selectively covers or occludes a portion of one of the duct portions 42 or 43. Partial occlusion of the entrained duct channel 43 serves to increase pressure in the air-only duct channel 42, increase the pressure within the outer chamber 72, and increase the quantity and speed of the air flowing through the slots 75 and into the inner chamber 74. The additional air from the slots 75 mixes with the air-entrained material in the inner chamber 74 while urging it away from the inner wall 71 and further enhancing the vortex as the entrained material passes downwardly into the processor cone 2.

As shown in FIG. 1, the flow of air upwardly and outwardly from the processor 2 through the exhaust sleeve 3 may be regulated by actuation of the rod 25 to raise or lower the damper 24 so that it selectively covers or occludes the exhaust sleeve 3, thereby controlling the rate of exhaust. The dwell time of entrained material within the processor cone 2 may be increased by coordinated adjustment of the damper 24 and the vane 53.

The pressure gradient within the processor 2 may be regulated by actuation of the exhaust sleeve actuator 23, to selectively raise and lower the inner sleeve 15 in a telescopic manner within the outer sleeve 14 (FIG. 4). This serves to shift the lower opening 22 of the sleeve 3 upwardly or downwardly with respect to the conical chamber of the processor 2 without the necessity of moving the damper mechanism 24, the vortex initiator 7 or the processor 2.

Advantageously, the construction of the vortex initiator 7 and the telescoping sleeve 3 described herein cooperate to cause the flow of air with entrained material to form a vortex within the cyclone processor 2, to enhance the formation of the vortex in the vortex initiator 7, to urge air-entrained material away from the inner wall 71 and to facilitate control of the pressure gradient within the vortex.

It is to be understood that while certain forms of the present vortex initiator have been illustrated and described herein, the construction of the claims is not to be limited to the specific forms or arrangement of parts described and shown.

Having described the preferred embodiments, the following is claimed as new and desired to be secured by Letters Patent:

1. A cyclone processing system comprising:
   (a) a cyclone processor having a larger diameter upper entry end and a smaller diameter lower outlet end opposite said entry end;
   (b) an exhaust sleeve extending into said entry end;
   (c) a blower operable to generate a flow of air;
   (d) a duct communicating with said blower and receiving said flow of air, said duct including a wall dividing said duct into an air-only duct portion and an entrained duct portion;

(e) a feeder communicating with said entrained duct portion and entraining a material to be processed into said flow of air through said entrained duct portion;

(f) a vortex initiator positioned on said entry end of said cyclone processor and communicating said flow of air with entrained material from said duct to said cyclone processor, said vortex initiator including:

(1) an outer wall;

(2) an inner wall forming with said sleeve an arcuate inner chamber open to said cyclone processor and positioned in spaced relation within said outer wall to form an arcuate outer chamber therewith, said inner wall having a plurality of apertures spaced therealong; and (3) upper and lower walls end engaged with said outer wall and said inner wall in spaced relation, said lower wall closing said outer chamber, and said upper wall sealingly engaging said sleeve to thereby close upper sides of said inner and outer chambers;

(g) said duct engaging said vortex initiator such that said air-only duct portion communicates air into said outer chamber and said entrained duct portion communicates air with material entrained therein into said inner chamber, said flow of air with material entrained therein forming a vortex, and airflow through said apertures enhancing said vortex and urging the entrained material away from said inner wall; and (h) a vane pivotally mounted within said duct in angular relation to said wall and operable to selectively proportion said airflow between said air-only duct portion and said entrained duct portion.

2. The cyclone processing system as set forth in claim 1, said sleeve further including:

(a) telescoping sleeve sections and a sleeve actuator engaged between said sleeve sections to selectively vary a length of said sleeve.

3. The cyclone processing system as set forth in claim 1, further including:

(a) a vane actuator engaged with said vane to pivot said vane to selectively proportion said airflow.

4. The cyclone processing system as set forth in claim 1, further including:

(a) a venturi positioned between said feeder and said entrained duct portion, said venturi forming a low pressure area to cause positive introduction of material into said entrained duct portion.

5. The cyclone processing system as set forth in claim 1, said inner wall apertures further comprising circumferentially spaced, axially oriented slots, each slot subtending an angle with respect to said inner wall for directing said airflow through said apertures in a substantially tangential manner.

6. A cyclone processing system comprising:

(a) a conically shaped cyclone processor having a larger diameter upper entry end and a smaller diameter lower outlet end opposite said entry end;

(b) an exhaust sleeve extending into said entry end of said cyclone processor;

(c) a blower operable to generate a flow of air;

(d) a duct communicating with said blower and receiving said flow of air therefrom, said duct including a divider wall separating said duct into an air-only duct portion and an entrained duct portion;

(e) a feed inlet communicating with said entrained duct portion and entraining a material to be processed in said cyclone processor into said flow of air through said entrained duct portion;

(f) a cylindrical vortex initiator positioned on said entry end of said cyclone processor and communicating said flow of air with entrained material from said duct to said cyclone processor, said vortex initiator including:

(1) a partially cylindrical outer wall;

(2) a partially cylindrical inner wall forming with said sleeve an inner annular chamber open to said cyclone processor and positioned coaxially within said outer wall to form an outer, substantially annular chamber therewith, said inner wall having a plurality of circumferentially spaced, axially oriented slots formed therethrough, and said inner wall engaging said divider wall of said duct in a tangential manner;

(3) annular upper and lower walls end engaged with said outer wall and said inner wall in axially spaced relation, said lower wall closing said outer annular chamber, and said upper wall sealingly engaging said sleeve to thereby close upper sides of said inner and outer annular chambers;

(g) said duct engaging said vortex initiator in a tangential manner such that said air-only duct portion communicates pressurized air into said outer annular chamber and said entrained duct portion communicates air with material entrained therein into said inner annular chamber;

(h) said inner annular chamber, outer annular chamber, and said slots cooperating to cause said flow of air with material entrained therein to form a vortex within said cyclone processor, with airflow through said slots further enhancing formation of said vortex and urging the entrained material away from said inner wall; and (i) a vane pivotally mounted within said duct in angular relation to said wall and operable to selectively proportion said airflow between said air-only duct portion and said entrained duct portion.

7. The cyclone processing system as set forth in claim 6, said sleeve further including:

(a) telescoping sleeve sections and a sleeve actuator engaged between said sleeve sections to selectively vary a length of said sleeve.

8. The cyclone processing system as set forth in claim 6, further including:

(a) a vane actuator engaged with said vane to pivot said vane to selectively proportion said airflow.

9. The cyclone processing system as set forth in claim 6, further including:

(a) a venturi positioned between said feeder and said entrained duct portion, said venturi forming a low pressure area to cause positive introduction of material into said entrained duct portion.

10. The cyclone processing system as set forth in claim 6, said inner wall apertures further comprising circumferentially spaced, axially oriented slots, each slot subtending an angle with respect to said inner wall for directing said airflow through said apertures in a substantially tangential manner.

11. A cyclone processing system comprising:

(a) a conically shaped cyclone processor having a larger diameter upper entry end and a smaller diameter lower outlet end opposite said entry end;

(b) an exhaust sleeve having a lower end extending into said entry end of said cyclone processor, said sleeve including telescoping sleeve sections and a sleeve actuator engaged between said sleeve sections to selectively vary a length of said sleeve to thereby selectively position said lower end of said sleeve within said cyclone processor;

(c) a blower operable to generate a flow of air;

(d) a duct communicating with said blower and receiving said flow of air therefrom, said duct including a divider wall separating said duct into an air-only duct portion and an entrained duct portion;

(e) a vane pivotally mounted within said duct in angular relation to said divider wall and including a vane actuator engaged with said vane to pivot said vane to selectively proportion said airflow between said air-only duct portion and said entrained duct portion;

(f) a feed inlet communicating with said entrained duct portion and entraining a material to be processed in said cyclone processor into said flow of air through said entrained duct portion;

(g) a cylindrical vortex initiator positioned on said entry end of said cyclone processor and communicating said flow of air with entrained material from said duct to said cyclone processor, said vortex initiator including:

(1) a partially cylindrical outer wall;

(2) a partially cylindrical inner wall forming with said sleeve an inner annular chamber open to said cyclone processor and positioned coaxially within said outer wall to form an outer, substantially annular chamber therewith, said inner wall having a plurality of circumferentially spaced, axially oriented slots formed therethrough, and said inner wall engaging said divider wall of said duct in a tangential manner;

(3) annular upper and lower walls end engaged with said outer wall and said inner wall in axially spaced relation, said lower wall closing said outer annular chamber, and said upper wall sealingly engaging said sleeve to thereby close upper sides of said inner and outer annular chambers;

(g) said duct engaging said vortex initiator in a tangential manner such that said air-only duct portion communicates pressurized air into said outer annular chamber and said entrained duct portion communicates air with material entrained therein into said inner annular chamber; and (h) said inner annular chamber, outer annular chamber, and said slots cooperating to cause said flow of air with material entrained therein to form a vortex within said cyclone processor, with airflow through said slots further enhancing formation of said vortex and urging the entrained material away from said inner wall.

12. The cyclone processing system as set forth in claim 11, further including:

(a) a venturi positioned between said feeder and said entrained duct portion, said venturi forming a low pressure area to cause positive introduction of material into said entrained duct portion.

13. The cyclone processing system as set forth in claim 11, said inner wall apertures further comprising circumferentially spaced, axially oriented slots, each slot subtending an angle with respect to said inner wall for directing said airflow through said apertures in a substantially tangential manner.

* * * * *